No. 807,926. PATENTED DEC. 19, 1905.
D. H. HENDERSHOT.
SHAFT COUPLING.
APPLICATION FILED JULY 31, 1905.
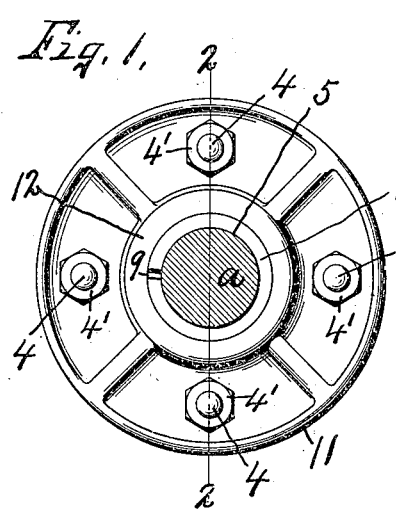
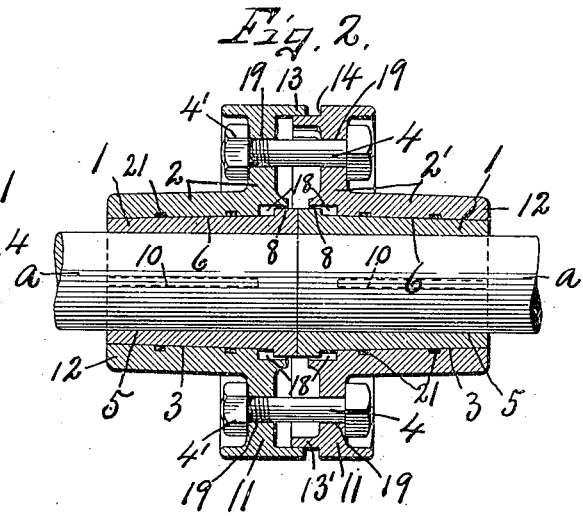
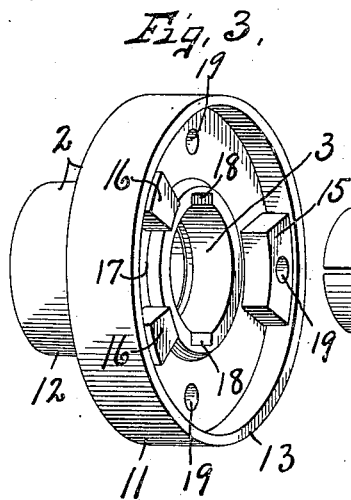
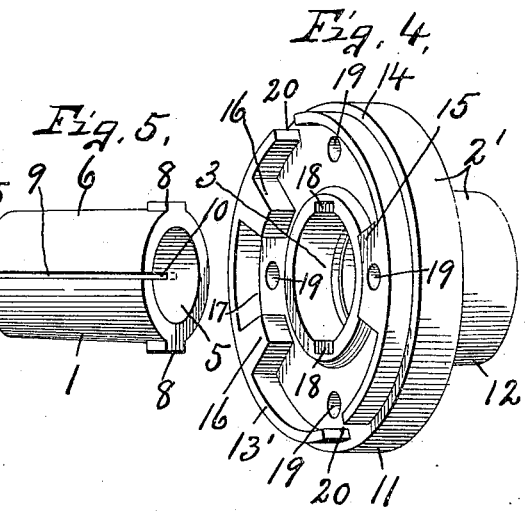
WITNESSES:
B. E. Robinson.
H. E. Chase
INVENTOR:
Daniel H. Hendershot
BY:
Howard P. Denison
ATTORNEY.

UNITED STATES PATENT OFFICE.

DANIEL H. HENDERSHOT, OF BALDWINSVILLE, NEW YORK.

SHAFT-COUPLING.

No. 807,926.             Specification of Letters Patent.          Patented Dec. 19, 1905.

Application filed July 31, 1905. Serial No. 271,977.

*To all whom it may concern:*

Be it known that I, DANIEL H. HENDERSHOT, of Baldwinsville, in the county of Onondaga, in the State of New York, have invented new and useful Improvements in Shaft-Couplings, of which the following, taken in connection with the accompanying drawings, is a full, clear, and exact description.

This invention relates to improvements in shaft-couplings, and refers more particularly to that class in which opposed casing-sections are drawn together by suitable bolts axially of the shaft and upon tapering collars or sleeves which grip the shaft.

I am aware that it is broadly old to wedge a split tapering sleeve upon the meeting ends of the shaft-sections by means of axially-movable collars drawn together by bolts passing through both collars or casing-sections, such devices being shown in Patents No. 687,864, December 3, 1901, Smyth, and Shaw, No. 674,024, May 14, 1901, the sleeves in both cases being of the double-cone type. I am also aware of the existence of Patent No. 753,439, March 1, 1904, to D. S. Sinclair, which shows two split tapering sleeves clamped upon the shaft-sections by screw-threaded collars or casing-sections. It is well known that when these couplings are once secured in position to lock the meeting ends of the shaft they are run for a considerable period of time without displacement of any of the parts and that during such period the casing-sections become set by rusting or otherwise upon the tapering sleeves, which in turn also become rigidly set upon the shaft-sections, making it very difficult to remove the parts of the coupling or to uncouple the shaft-sections without liability of breaking some of the parts. It is also well known that when separate tapering sleeve-sections are employed to grip the shaft the circumferential strain upon the casing-sections is borne almost wholly by the bolts which draw them together unless some provisions is made for interlocking one casing-section with the other aside from the bolts to prevent their independent circumferential movement relatively to each other. Furthermore, in the use of single double-taper sleeves, as in the Smyth and Shaw patents previously referred to, I have found that the grip is mostly at the extreme ends of the sleeves, and therefore remote from the meeting ends of the shaft, owing to the fact that the center of the sleeve is necessarily thicker than the ends and less yielding, thereby preventing the rigid engagement or firm grip of the center of the sleeve upon the ends of the shaft-sections and bringing an undue strain upon the thinner ends where the sleeve is the weakest.

My object, therefore, is, first, to cause the separate tapering sleeve-sections to grip the shaft-sections with a uniform pressure throughout their entire lengths; second, to lock each sleeve-section to its casing-section and to interlock one casing-section with the other to prevent independent relative movement circumferentially; third, to enable the casing-sections to be exactly centered one within the other concentric with the shaft-sections before they are drawn together, thereby forming a centering-guide to keep the shaft-sections in exact alinement while the clamping-bolts are being tightened.

A further object is to mill the ends of the casing-section to bring them in planes exactly at right angles to the axis of revolution, so that the meeting faces may be calipered at intervals while the bolts are being drawn up, thereby further facilitating the exact centering of the shaft-sections relative to each other.

Another object is to provide the telescoping flange of one case-section with diametrically opposite cut-outs for the reception of a drift-tool to force said sections apart when it is desired to uncouple the shaft-sections.

In the drawings, Figure 1 is an end view of my improved shaft-coupling, showing the shaft in section. Fig. 2 is a longitudinal section taken on line 2 2, Fig. 1. Figs. 3 and 4 are perspective views of the opposed casing-sections. Fig. 5 is a perspective view of one of the tapering sleeve-sections.

In carrying out the objects stated I employ a pair of separate but similar tapering sleeve-sections 1, which are placed upon the meeting ends of the shaft-sections, as *a*, to be coupled and are inclosed and engaged by opposite but similar collars or casing-sections 2 and 2', having tapering bores 3 fitting snugly upon their respective sleeve-sections, said casing-sections being drawn together upon the tapering sleeves 1 by clamping-bolts 4.

The sleeve-sections 1 are exact duplicates, and each consists of a truncated conical metal bushing having a central lengthwise-cylindrical bore or shaft-opening 5 and a tapering outer surface 6, terminating at its large end in annular flanges or diametrically opposite raised bosses or projections 8, said sleeve being divided longitudinally at 9 through one side from end to end, and is also provided with a diametrically opposite slot 10, extending from the small end and terminating at or near the boss 8, the division 9 and slot 10 being located substantially midway between the bosses or projections 8.

The casing-sections 2 and 2' are also quite similar in construction, each being provided with a central lengthwise-tapering opening 3, extending therethrough from end to end, and are also each provided with an enlarged head 11 and a reduced tapering outer end 12.

The meeting face or end of each casing-section 2 and 2' is recessed, forming an annular flange 13 and 13', the inner diameter of the flange 13 being substantially the same as the outer diameter of the flange 13', and the latter flange is adapted to fit easily within the flange 13, so that the meeting ends of the casing-sections 2 and 2' telescope with each other for the purpose of centering the shaft-sections one with the other before the clamping-bolts are tightened and at the same time bringing the sleeves 1 and casing-sections 2 and 2' into concentricity with the axis of the shaft.

The flange 13' is somewhat smaller than the remaining portion of its head 11, leaving an annular abutment or truing face 14. This face 14 and the end face of the flange 13 are milled in planes at exactly right angles with the axis of their respective sections, the object of which is to permit the intervening space to be calipered at intervals around the circumference of the flange 13', so that all parts of both casing-sections may be adjusted axially alike by the clamping-bolts to prevent binding or throwing the shaft-sections out of alinement.

The meeting end of each casing-section 2 and 2' is provided with a series of, in this instance three, radial lugs or locking-shoulders 15 and 16, the shoulders 15 and 16 of the section 2' projecting inwardly and radially from the inner face of the flange 13', while the shoulders 15 and 16 of the case-section 2, are spaced apart from the flange 13, a distance substantially equal to the thickness of the flange 13' to permit said flange to enter between the flange 13 and interlocking shoulders 15 and 16 of the section 2.

I preferably provide each of the sections 2 and 2' with a pair of shoulders or lugs 16, which are spaced apart circumferentially, leaving an intervening space 17 of substantially the same shape and size as the shoulder 15, which is diametrically opposite to said space 17, so that when the sections 2 and 2' are brought together end to end in the act of coupling the shaft-sections the shoulder 15 of each section enters the space 17 of the opposite section at the same time that the flange 13' enters within the flange 13, thereby centering and locking the casing-sections 2 and 2' against circumferential or radial movement relatively to each other and relieving shearing strains upon the clamping-bolts 4.

The inner or meeting end of each bore 3 is provided with diametrically opposite recesses or channels 18, which receive the projections 8 of their respective sleeve-sections 1 for the purpose of locking each sleeve-section to its casing-section against independent circumferential movement.

It is now clear that when the coupling parts are operatively mounted upon the shaft-sections the sleeves 1 are locked to their casing-sections, and the casing-sections are locked to each other against independent rotary movement.

Each of the enlarged heads 11 of the casing-sections 2 and 2' is provided with a series of, in this instance four, bolt-openings 19, which are spaced equidistant apart circumferentially around the sleeve-opening 3 beyond the periphery of the adjacent end of the tapering part 12, and the outer end faces of each of the heads 11 are formed with annular recesses of sufficient radial and axial depth to receive and conceal the heads of the bolts 4, which are passed through the openings 19 of both of the casing-sections 2 and 2' and are engaged at one end by nuts 4'. In placing these coupling parts upon the shaft-sections the casing-sections 2 and 2' are first placed over the ends of their respective shaft-sections and moved back far enough to permit the sleeve-sections 1 to be similarly placed upon the ends of said shaft-sections with their enlarged ends facing each other and substantially coincident with the meeting end faces of the shaft-sections, so that the adjacent ends of the sleeve-sections practically abut against each other when the shaft-sections are brought into axial alinement end to end. After the sleeve-sections 1 have been thus placed upon their respective shaft-sections, which they closely fit, the outer casing-sections 2 and 2' are then drawn toward each other along the tapering faces of their respective sleeve-sections until the flange 13' enters the flange 13 and the shoulders 15 of one section enter the space 17 of the opposite section, whereupon the bolts 4 are inserted in their respective openings in both casing-sections and engaged by the nuts 4', by which the opposed casing-sections are firmly drawn toward each other to compress the sleeve-sections 1 upon their respective shaft-sections.

The object of splitting each of the sleeve-sections 1 through one side from end to end is to enable all parts thereof to be compressed into firm gripping engagement with the shaft as the casing-sections are drawn together. It is therefore clear that the gripping-surface of the coupling is coextensive with the inner area or bore of both sleeve-sections, because these sleeve-sections are firmly locked to the case-sections 2 and 2' against rotation independently of each other, and the case-sections are also locked against independent rotation through the medium of the interlocking shoulders 15 and 16, thus making, in effect, a substantially unitary structure acting to compress the sleeves firmly upon the shaft.

In order that the coupling-sections may be readily taken apart when the bolts 4 are withdrawn, I provide the flange 13' with diametrically opposite radial openings 20, extending through the end face of the flange for the reception of the drift-tool, (not shown,) but which may be inserted through said opening so as to engage the end face of the flange 13 and abutting face 14 of the case-section 2', thereby separating said case-sections and releasing the same from engagement with their respective sleeves, said sleeves extending through the outer end faces of the casing-sections and may be also engaged by a suitable driving-tool to release the sleeves from the casing-section in case they should slide back when separating said casing-sections.

In drawing the casing-sections together it is desirable to have them slide as freely as possible upon their respective sleeves, and for this purpose I provide the tapering faces of the case-sections 2 and 2' with one or more annular grooves, in which are seated suitable packing-rings 21, of graphite or similar lubricant.

What I claim—

1. In a shaft-coupling, two opposed tapering sleeves, one for each shaft-section, in combination with two opposed casing-sections having conical inner bearings fitting upon their respective tapering sleeves, said sleeves and casing-sections having shoulders interlocking with each other, and the casing-sections having additional shoulders on their adjacent end faces interlocking with each other, and clamping-bolts for drawing said casing-sections toward each other.

2. In a shaft-coupling, two tapering sleeves split longitudinally through one side from end to end, and each having a radial boss near its meeting end, in combination with opposed casing-sections, each fitted upon one of the sleeves and movable endwise thereon, the meeting end of each casing-section having a recess receiving said boss, and means to draw the casing-sections toward each other.

3. In a shaft-coupling, two split tapering sleeves, in combination with opposed casing-sections, each fitted upon and movable lengthwise of one of the sleeves, said casing-sections having interlocking shoulders engaging each other as the casing-sections are drawn together, and clamping-bolts for drawing said sections toward each other.

4. In a shaft-coupling, the combination of two tapering sleeve-sections split through one side, separate casing-sections each fitted upon and movable endwise of one of the sleeves, said casing-sections having their meeting ends provided with annular flanges, one fitting within the other, clamping-bolts for drawing said casing-sections together, said casing-sections having radial lugs on their meeting ends for locking the casing-sections together against independent rotary movement.

5. In a shaft-coupling, the combination of two separate tapering sleeves, each split longitudinally through one side and having a radial boss, separate casing-sections each fitted upon and movable endwise of one of the sleeves, and provided with a recess receiving said boss said casing-sections having interlocking shoulders on their meeting ends and also formed with annular flanges on said meeting ends, one flange fitting within the other and provided with openings therethrough, for the purpose described.

In witness whereof I have hereunto set my hand this 22d day of July, 1905.

DANIEL H. HENDERSHOT.

Witnesses:
H. E. CHASE,
M. M. NOTT.